April 24, 1962   G. J. BOWAR ETAL   3,031,653
PROTECTIVE CIRCUITRY AND INDICATING MEANS
FOR RECTIFIER SYSTEMS
Filed July 17, 1958                                       3 Sheets-Sheet 2

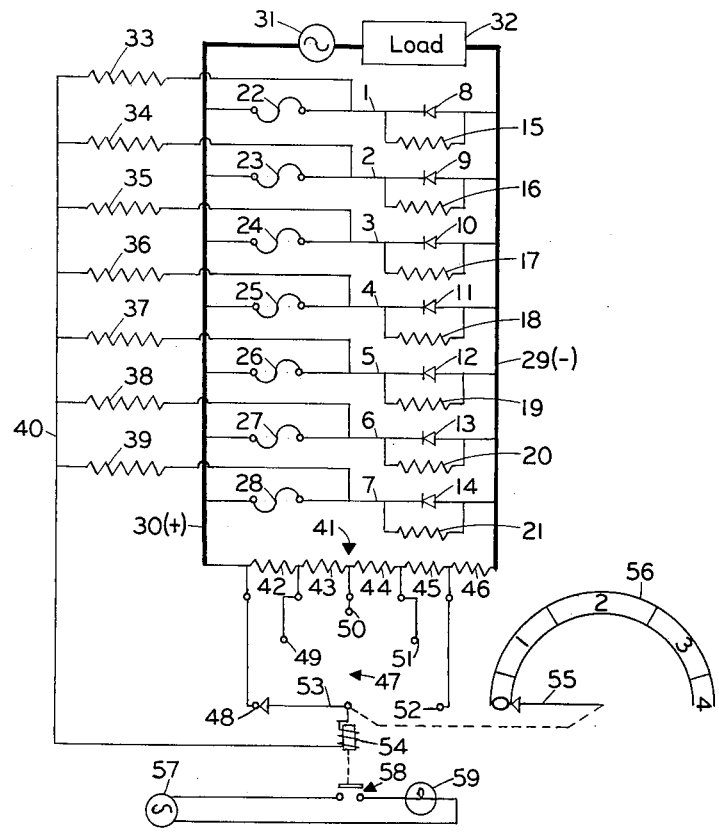
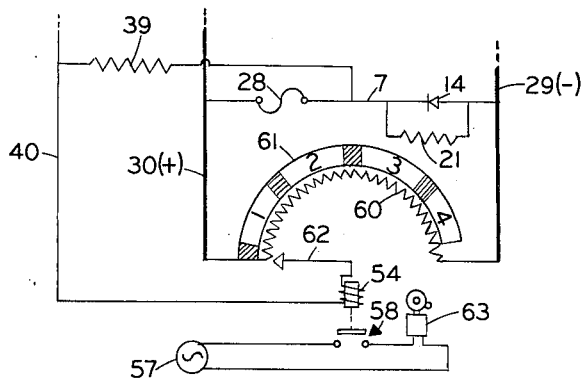
Fig. 1
Fig. 2

INVENTORS
Gerald J. Bowar
Fred W. Kelley, Jr.
James P. Wiles
BY Robert J. Peck
Their Attorney INVENTORS
Gerald J. Bowar
Fred W. Kelley, Jr.
James P. Wiles
BY Robert F. Peck
Their Attorney

United States Patent Office 3,031,653
Patented Apr. 24, 1962

3,031,653
PROTECTIVE CIRCUITRY AND INDICATING
MEANS FOR RECTIFIER SYSTEMS
Gerald J. Bowar, Fred W. Kelley, Jr., and James P. Wiles, Lynchburg, Va., assignors to General Electric Company, a corporation of New York
Filed July 17, 1958, Ser. No. 749,177
9 Claims. (Cl. 340—250)

Our invention relates to rectifier systems which normally supply a large current to a load and more particularly to protective circuitry and indicating means for such rectifier systems, as well as the method used to derive protection therein.

In many large rectifier installations a great number of rectifying legs are individually fused and are connected in parallel to form a rectifier bank. The rectifier banks may be used individually, as in a single-phase system, or they may be used in multiple, as in a polyphase system wherein each rectifier bank is connected to one of the phase legs. The usual failure of a rectifier is in the form of a short circuit across the rectifier which consequently results in the blowing of the corresponding fuse in the rectifier leg. The failure of one or more rectifying legs in a rectifier bank causes a diversion of the current carried by those legs to the remaining rectifier legs in the bank. Depending upon how near maximum rated current, the remaining legs were already operating, this may result in excessive current being carried by the remaining legs and their early failure. In order to prevent the failure of the entire rectifier bank, suitable protective circuitry is necessary so that the failure of one or more rectifiers may be noted and the bank disconnected when the number of failures reaches a predetermined dangerous number.

Prior forms of protective circuitry and indicating means have consisted of a lamp or visual indicator for each individual rectifier leg or a trip circuit for disconnecting the power source upon the failure of a single fuse in a bank. It is apparent that such indicating means are not satisfactory where, as in the usual case, the banks consist of a great number of rectifier units which are under the supervision of a single person and inspection of the indicators can be only infrequently accomplished. In addition, since the rectifier banks are usually designed to be able to operate at a slight overload, the failure of a single rectifier or possibly a small number of rectifiers in a bank would not warrant the disruption of service to replace the faulty rectifiers. However, when the number of defective rectifiers has reached a predetermined amount such that the remaining rectifier legs may be seriously overloaded, it is desirable that a trip be actuated to disconnect the power source and allow the replacement of the faulty rectifiers.

Accordingly, one object of our invention is to provide improved protective circuitry and indicating means for rectifier systems, together with an improved method of deriving protection in such systems.

An additional object of our invention is to provide means for remotely indicating the number of blown fuses in a rectifier bank.

A further object of our invention is to provide remote indicating means for a polyphase rectifier system wherein the number of blown fuses in each rectifier bank of the polyphase system may be determined from a remote station.

Another object of our invention is to provide means for disconnecting the power source from the rectifier system upon the failure of a predetermined number of rectifiers.

Further objects and advantages of our invention will become apparent as the following description proceeds.

Briefly stated, in accordance with one aspect of our invention, we provide circuit means common to all of the rectifiers in a rectifier bank which respond to the blowing of fuses in the bank to initiate a series of different control signals corresponding to successive blown fuses. Sequentially operated indicating means are provided to respond to these control signals to count the number of blown fuses in the bank. The indicating means may take a variety of forms, with or without separate alarm circuits, such that the number of blown fuses may be counted either automatically or by manual manipulation of the protective equipment. The indicating means may be common to one or more banks, thereby achieving a reduction in cost and complexity over prior forms.

While the specification concludes with claims particularly pointing out and distinctly claiming the subject matter which we regard as our invention, it is believed that our invention will be better understood from the following description taken in connection with the accompanying drawings in which:

FIG. 1 is a schematic wiring diagram showing the arrangement of a single-phase rectifier system embodying our invention;

FIG. 2 is a partial schematic wiring diagram showing a modification of the invention shown in FIG. 1;

Figure 3:
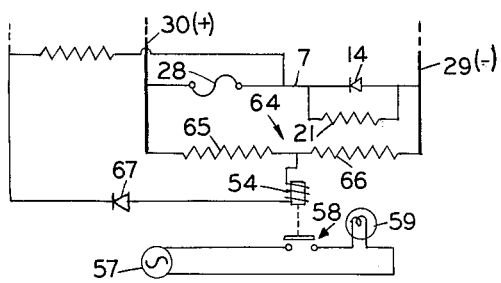
FIG. 3 is a partial schematic diagram similar to FIG. 2, but illustrating a further modification of our invention.

The rectifier system which is shown in FIG. 1 comprises a plurality of fused rectifier legs shown generally as 1–7 which are connected in parallel to form a rectifier bank. It is well known that the number of fused rectifier legs which are used in a given rectifier bank would be dependent upon the total amount of current that is required to be handled by the rectifier bank and our invention may be applied to rectifier banks comprising a great many more rectifier legs than are shown. Each of the rectifier legs 1–7 includes a rectifier 8–14, respectively, a balancing resistor 15–21, respectively, in parallel with the rectifier, and a fuse 22–28, respectively, in series with the rectifier. In practice, there may be several rectifiers and several balancing resistors in each rectifier leg and the purpose of the balancing resistors in each rectifier leg would be to distribute equally between the various rectifiers in series the inverse voltage developed across the rectifier leg. For the purpose of illustrating the circuit operation it may be considered that the several rectifiers and balancing resistors per leg are lumped together and that only a single rectifier and balancing resistor need be shown in each leg.

The rectifier system of FIG. 1 includes a negative D.-C. bus 29 and a line bus 30. The bus 30 is in series with one leg of a single-phase A.-C. source 31 and the negative D.-C. bus 29 is in series with the second leg of the A.-C. source 31 through a load 32. The rectifier legs 1–7 are connected in parallel across the buses 30 and 29 to form a rectifier bank and they complete the circuit making up a single-phase A.-C. rectifier system. It is obvious that the rectifier bank arrangement can be used in various single-phase and polyphase rectifier installations wherein a plurality of rectifier banks are utilized in a manner well known to those skilled in the art to convert A.-C. to D.-C. and our invention is not, therefore, limited only to the single-phase system illustrated by FIG. 1. It is further apparent that various other conventional components such as circuit breakers, ripple filter capacitors, and cooling arrangements have been omitted for the sake of clarity in this discussion.

In order to provide a circuit for detecting the number of blown fuses in the rectifier bank, a plurality of sensing resistors 33–39 are each connected at one side to the junction point of the rectifier and fuse of each corresponding fused rectifier leg. The sensing resistors 33–39 are all connected together at their other side to a common bus 40. It should be noted that in the preferred embodiment sensing resistors 33–39 are all substantially equal in value in order that voltage changes due to the blowing of fuses may be more easily determined.

A discussion at this point of the effect of blowing a fuse may be helpful in more fully understanding our invention. Under normal operation conditions, with no fuses blown, each of the sensing resistors 33–39 is tied at one side through fuses 22–28, respectively, to the positive D.-C. bus 30. The effect of this on common bus 40 is to maintain the common bus at the same potential as the positive bus 30. Should a fuse in one of the rectifier legs blow due to the shorting of a rectifier or due to overload or any other cause, the potential of the common bus 40 would then become more negative than the bus 30 in an amount dependent upon the number of rectifier legs in the rectifier bank and the voltage across the rectifier bank. In this particular case, assume that the rectifier 8 becomes shorted and fuse 22 blows in consequence of the shorting of this rectifier. During the blocking half cycle of the rectifier bank a current will flow from the line bus 30 through fuses 23–28 to rectifier legs 2–7, respectively, through sensing resistors 34–39, respectively, to common bus 40, through sensing resistor 33, through the shorted rectifier 8, to the negative bus 29. It is obvious under these circumstances that the potential of common bus 40 will then have changed from its initial value equal to that of the positive bus 30 to a new value which is negative with respect to the bus 30 due to the voltage drops across sensing resistors 33 and 34–39. Following this line of reasoning, should a second fuse blow, such as fuse 23 due to the shorting of rectifier 9, the common bus 40 will then change in potential still further negative with respect to the bus 30 due to the voltage dividing effect achieved by paralleled sensing resistors 33 and 34 which are in series with paralleled sensing resistors 35–39 from the negative bus 29 to the bus 30. As further fuses blow, the common bus 40 tends to become more and more negative with respect to the bus 30.

In order to utilize the change in potential of the common bus 40 with respect to the positive bus 30 as an information source for indicating purposes, a voltage divider, shown generally at 41, is provided in parallel with the rectifier bank. The voltage divider comprises a plurality of resistors 42–46 connected in series across the buses 29 and 30. A rotary switch 47 is provided having a plurality of stationary contacts 48–52 which are connected to various tap points of the voltage divider 41 so that a different potential exists at each stationary contact. The resistors comprising voltage divider 41 are selected so as to provide various potentials at their junction points. The desired values for these resistors are such that the potential existing at stationary contact 49 will be substantially the same as the potential existing in common bus 40 when one fuse has blown in the rectifier bank, the potential existing at stationary contact 50 will be similar to that of common bus 40 when two fuses are blown, and the potentials existing at stationary contacts 51 and 52 will be similar to that of common bus 40 when three or four fuses, respectively, have blown in the rectifier bank. As shown in FIG. 1, stationary contact 48 is connected to positive bus 30 and, therefore is at the potential of the bus. It is obvious that the sequence of connecting stationary switch contacts to the voltage divider 41 at various potential tap points corresponding to the potential existing in common bus 40 as a greater number of fuses blow in the rectifier bank may be carried out to any desired number consistent with the number of fused rectifier legs in the bank and overload considerations. It is further apparent that a given rectifier bank may be broken up into a plurality of groups of rectifier legs, each group having the components necessary to sense the number of blown fuses existing in the group.

In order to provide a sequential indication of the number of blown fuses in the rectifier bank, movable contact 53 of switch 47 is serially connected through the coil of relay 54 to the common bus 40. An indicating pointer 55 is correlated with movable contact 53 by a mechanical connection so as to change position with the movable contact as the contact position is varied. An indicia scale 56 is associated with the pointer 55 so as to indicate the number of blown fuses in the rectifier bank corresponding to the position of movable contact 53. It is apparent that when movable contact 53 is in the position shown and in contact with stationary contact 48 the potential on either side of relay 54 will be the same, that is, both sides of relay 54 are at the potential of the bus 30. Should a fuse blow in the rectifier bank and the potential of the common bus 40 become negative with respect to the bus 30 a current will flow through relay coil 54 thereby energizing the relay. When relay 54 is energized it moves a pair of normally open contacts 58 to the closed position thereby energizing indicating lamp 59 from the A.-C. source 57 and giving an indication that a fuse has blown.

In order to determine the number of blown fuses in the rectifier bank, switch 47 is rotated so that movable contact 53 engages stationary contact 49 of switch 47. In this position, with one fuse blown, the potential on either side of the relay coil 54 then becomes substantially the same and the relay will drop out, thereby de-energizing indicating lamp 59. As switch 47 was turned to the new position, indicating pointer 55 also turned with it and the indicator now points to the indicia scale 56 showing that one fuse has blown in the rectifier bank. Should a second fuse blow in the rectifier bank and the potential of common bus 40 become negative with respect to the potential at stationary contact 49, a current will again flow through relay coil 54, thereby energizing the relay and indicating another blown fuse. Switch 47 may then be rotated so that movable contact 53 engages stationary contact 50 of switch 47. In this position, the potential on either side of relay coil 54 again becomes substantially the same and the relay will drop out, thereby de-energizing indicating lamp 59. The indicia scale 56 may then be observed to indicate that two fuses have blown in the rectifier bank. It is apparent that further blowing of fuses and rotation of the switch 47 will give an indication of the exact number of fuses that have blown in the rectifier bank by means of the correlated indicating pointer 55 and its associated indicia scale 56.

It frequently happens that a fuse will blow before the rectifier which it protects is damaged. In this case, the associated rectifier continues to block on the blocking half cycles and thus does not provide a conducting path from the negative bus 29 to the common conductor 40. However, the associated balancing resistor does provide a path which during the blocking half cycles enables current to flow through the associated sensing resistor to common conductor 40. For example, assume fuse 22 to be blown and its associated rectifier 8 to be undamaged. On the blocking half cycles, current flows from the line bus 30, through fuses 23–28 to rectifier legs 2–7 respectively, through sensing resistors 34–39 respectively to common bus 40, through sensing resistor 33, through balancing resistor 15 to the negative bus 29.

A slight variation of our invention is shown in FIG. 2. In this embodiment the voltage divider which is connected in parallel with the rectifier bank comprises a potentiometer 60 having an indicia scale 61 and a movable contact 62 associated with it. The numbering system used in FIG. 1 has been preserved in FIG. 2 as well as in all of the other figures wherein components which are the same as those in FIG. 1 have the same numerals assigned to them. In this embodiment with the movable contact 62 in the zero portion of the indicia scale, as the voltage in common bus 40 becomes negative with respect to the bus 30 due to the blowing of one or more fuses in the rectifier legs 1–7, the potential difference across relay 54 will cause the relay to pick up and sound a buzzer 63. When the buzzer sounds the potentiometer may be turned clockwise until the buzzer is de-energized at which point the indicia scale 61 will show the number of fuses blown in the rectifier bank.

The embodiment shown in FIG. 3 is designed to give an indication of the blowing of a predetermined number of fuses rather than an indication of the exact number of fuses that have blown in the rectifier bank. In this embodiment, a blocking rectifier 67 is inserted in series between the common bus 40 and sensing relay 54. A voltage divider 64, corresponding to the voltage dividers 41 and 61 of FIGS. 1 and 2, respectively, is connected in parallel with the rectifier bank. Resistors 65 and 66 of the voltage divider 64 are chosen so as to provide a voltage at their junction point which is substantially equal to the voltage that exists in the common bus 40 upon the blowing of one less than the predetermined number of fuses. Assuming that resistors 65 and 66 have been chosen so as to provide a voltage at their junction point equivalent to the voltage existing on common bus 40 with the blowing of three fuses in the rectifier bank and that an indication is desired upon the blowing of four fuses in the bank, it will be apparent that with the blowing of only one or two fuses in the rectifier bank the potential in the common bus 40, although being negative with respect to the bus 30, will still be positive with respect to the voltage at the junction of resistors 65 and 66. There will be no current flow between the common bus 40 and the voltage divider 64 since blocking rectifier 67 will be in a non-conducting condition until the voltage in the common bus becomes more negative than the voltage at the junction of resistors 65 and 66. Additionally, with the blowing of a third fuse in the rectifier bank the voltage on each side of relay 54 becomes substantially equal and no current will flow through the relay and therefore no indication will be given that the predetermined number of blown fuses has been reached; however, when a fourth fuse blows in the rectifier bank the potential of the common bus 40 then becomes sufficiently negative with respect to the potential at the junction point of resistors 65 and 66 so that a current flow will now take place through blocking rectifier 67 and relay 54 to the voltage divider 64. When this occurs relay 54 becomes energized thereby making contact 58 and energizing the lamp 59 from the voltage source 57. It is apparent that instead of lamp 59, a trip circuit to de-energize the rectifier bank or other means for indicating the desired information could be utilized.

Figure 4:
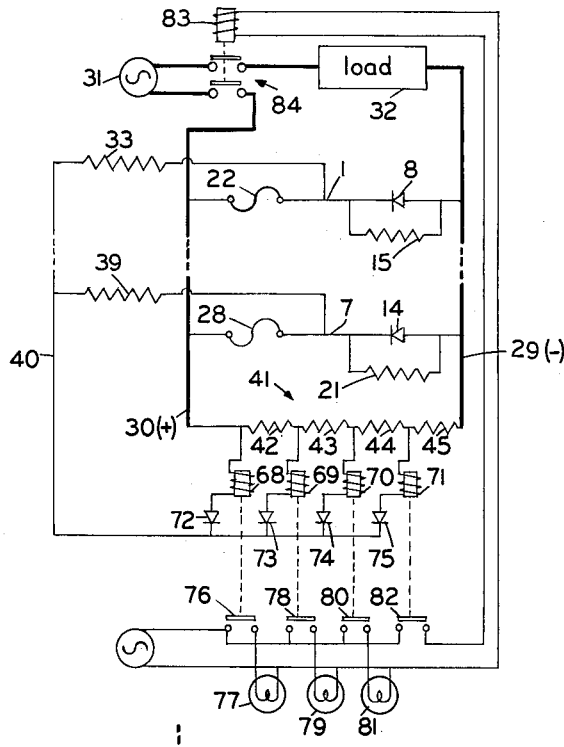
FIG. 4 is a partial schematic diagram similar to FIGS. 2 and 3 but illustrating still a different embodiment of our invention.

The embodiment shown in FIG. 4 may be used where it is desired that a sequential indication as to the number of blown fuses in the rectifier bank be given. In addition, the rectifier system is provided with means for de-energizing the system upon the blowing of a predetermined number of fuses. As was the case in the FIG. 1 embodiment, the common bus 40 of FIG. 4 varies in potential with the number of blown fuses in the rectifier bank, becoming more negative with respect to the positive bus as the number of blown fuses increases. Voltage divider 41 is provided in parallel with the rectifier bank and includes series resistors 42, 43, 44, and 45. Relay coils 68, 69, 70, and 71 are provided having one end connected to the voltage divider at various spaced points thereon. The other ends of the relay coils 68, 69, 70, and 71 are connected to the common bus 40 through blocking rectifiers 72, 73, 74, 75, respectively. Under normal operating conditions, with all fuses in good order, the blocking rectifiers 72–75 are all in their non-conducting condition and no current flow will occur through any of the relay coils 68 through 71. Upon the blowing of one fuse in the rectifier bank, the common bus 40 becomes more negative in potential than the bus 30 and blocking rectifier 72 becomes conductive and allows a current flow to pass through relay 68 to the positive bus 30, thereby energizing this relay. Relay 68 in turn energizes contact 76 to provide an indication through lamp 77 that one fuse has blown. With the blowing of a second fuse in the rectifier bank, the potential of common bus 40 becomes negative and blocking rectifier 73 then becomes conductive, in addition to blocking rectifier 72, so that relay coil 69 is energized, thereby energizing lamp 79 through contact 78. A similar procedure occurs upon the blowing of a third fuse in the rectifier bank, whereupon blocking rectifier 74 will become conductive allowing relay 70 to pick up contact 80 and energize lamp 81. In this embodiment, upon the blowing of a fourth fuse in the rectifier bank, blocking rectifier 75 will become conductive thereby energizing relay 71 and picking up contact 82. When contact 82 is picked up it, in turn, energizes relay 83. Relay 83 then opens contact 84 in the A.-C. supply circuit to the rectifier system. The blowing of the fourth fuse, therefore, serves to de-energize the entire rectifier system and prevent overloading of the remaining rectifier legs in the rectifier bank.

Figure 5:
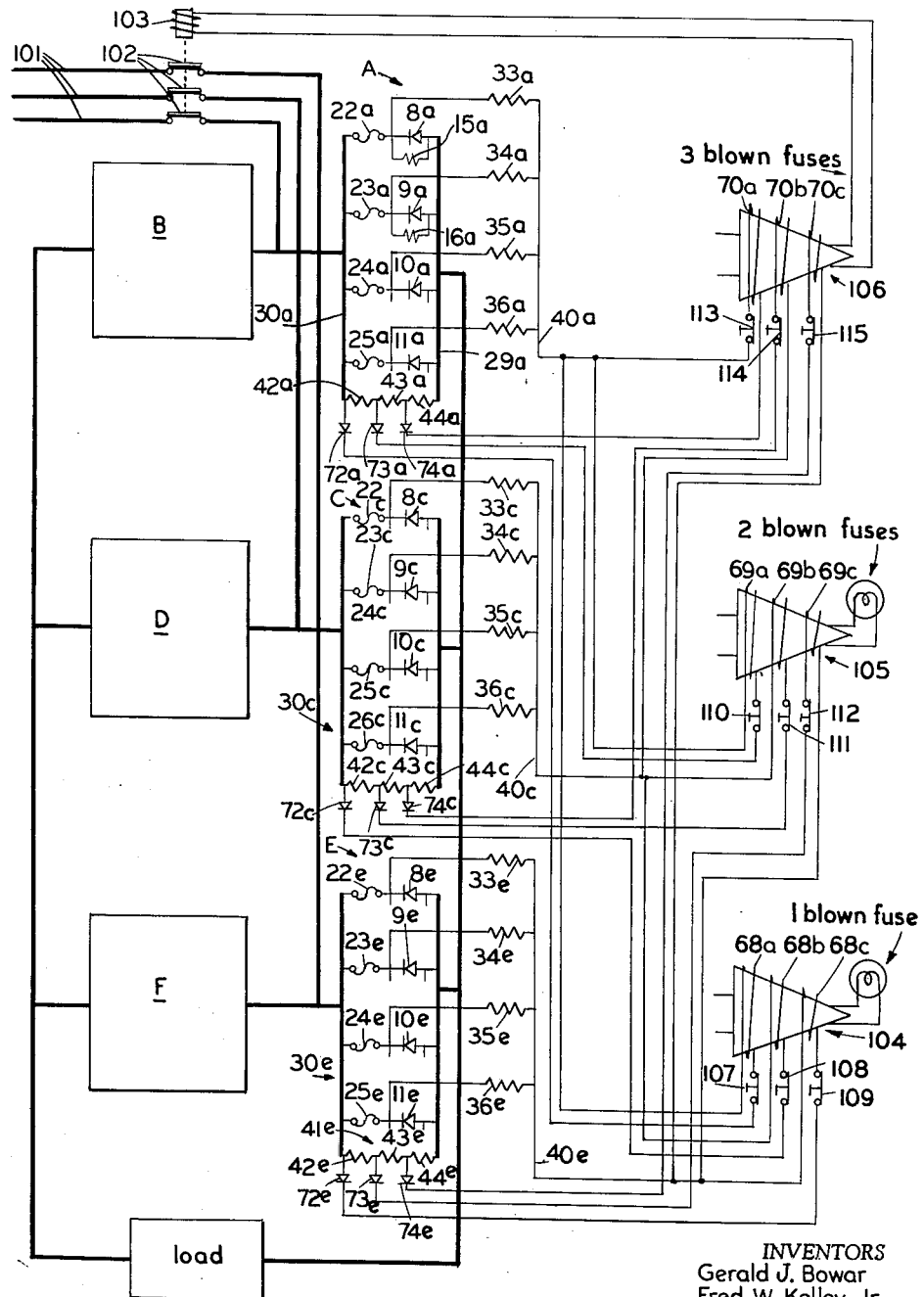
FIG. 5 is a schematic diagram of our invention as applied to a three-phase rectifier system.

In the three-phase rectifier system embodiment shown in FIG. 5, the rectifier system is supplied from a three-phase alternating current line 101 which includes circuit breaker contacts, shown generally at 102, which will interrupt the A.-C. supply circuit when relay coil 103 is energized. The trip relay is of a standard type which may require manual resetting to a closed position after having been once actuated. Each phase leg of the three-phase supply is connected to two rectifier banks which are arranged so that one of the two banks will be operative during positive half cycles of that phase leg and one will be operative during negative half cycles of that leg. As shown in FIG. 5, the rectifier banks are shown generally at A, B, C, D, E, and F. Banks A and B are connected to one phase leg of the three-phase supply. Banks C and D are connected to a second phase leg and banks E and F are connected to the third phase leg of the three-phase A.-C. supply. The individual rectifier banks are arranged in a manner corresponding to the arrangement shown for the FIG. 4 embodiment; however, magnetic amplifier control windings have been substituted for the relay coils of the FIG. 4 embodiment. Referring to rectifier bank A of FIG. 5, it may be seen that the essential components of the FIG. 4 embodiment have been renumbered with the letter "a" to indicate that they are similar components in the new embodiment. Balancing resistors 15a and 16a for rectifiers 8a and 9a are completely illustrated; those for the remaining rectifiers in phases A, B and C are merely indicated by short lines representing terminal connections. While we have shown each rectifier bank as comprising only four fused rectifier legs in order to make the drawing more comprehensible, it is understood that each rectifier bank may include many more legs than are actually shown. As in the FIG. 4 embodiment the potential of the common bus 40a will become negative with respect to the bus 30a with the blowing of fuses in the rectifier legs. With one blown fuse, blocking rectifier 72a becomes conductive and allows a current to flow from the line bus 30a, through control winding 68a, through the sensing resistor associated with the blown fuse, through the shorted rectifier leg to the negative bus 29a in order to energize the control winding of the magnetic amplifier 104. Should a second fuse blow in rectifier A, blocking rectifier 73a will then become conductive allowing a current to flow from line bus 30a through resistor 42a, through control winding 69a, through the sensing resistors associated with the two blown fuses, through the shorted rectifier legs and to the negative bus 29a thereby energizing magnetic amplifier 105. In the event that three fuses blow in rectifier A blocking rectifier 74a will become conductive thereby allowing a current to flow from line bus 30a through resistors 42a and 43a, through control winding 70a, through the sensing resistors associated with the three blown fuses, through the shorted rectifier legs and to the negative bus 29a thereby energizing magnetic amplifier 106. As contemplated in this embodiment, the energization of magnetic amplifier 104 will light a lamp indicating that one fuse has blown in one of the rectifier banks. The energization of magnetic amplifier 105 will light a lamp indicating two fuses have blown in one of the rectifier banks and the energization of magnetic amplifier 106 will cause trip relay coil 103 to be energized thereby tripping out contacts 102 in the three-phase supply line 101. The circuit arrangements of rectifier bank A are essentially duplicated in rectifier banks B, C, D, E, and F but, for purpose of clarity, only the circuitry involved in rectifier banks C and E are shown to indicate that each of the rectifier banks has a control winding on each of the three magnetic amplifiers.

Since any of the six rectifier banks may energize a given magnetic amplifier it is necessary to provide means for determining which of the six rectifier banks is the source responsible for the actuation of the particular magnetic amplifier. This identification is accomplished by means of normally closed push button switches 107–115. The push button switches are connected in series relationship between the blocking rectifiers of each rectifier bank and its associated control winding. In the event that the indicator lamp controlled by magnetic amplifier 104 should light due to one of the control windings energizing that magnetic amplifier, it may be seen that by selectively depressing the individual push buttons 107, 108, and 109, the rectifier bank responsible for the energization of the magnetic amplifier may be isolated thereby giving a complete identification as to the number of fuses blown and the particular rectifier bank in which these fuses have blown.

It is obvious that the use of the embodiment shown in FIG 5 will provide the necessary circuit rectifier system protection with a minimum of expense and effort. In this embodiment the magnetic amplifiers, indicator lamps and push button switches may all be remotely located from the rectifier system and supervision may be easily accomplished by a single person.

Figure 6:
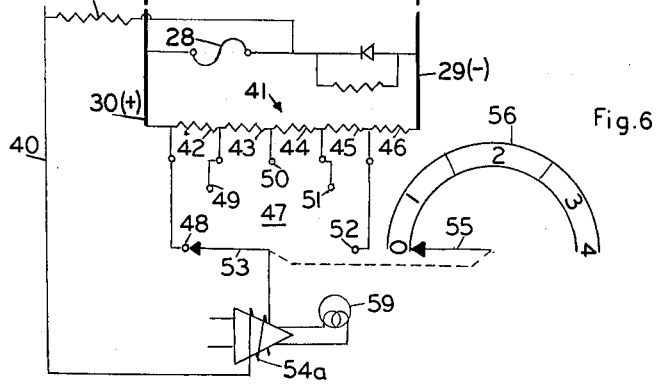
FIG. 6 is a partial schematic diagram similar to FIGS. 2, 3, and 4 but illustrating another modification of our invention.

In the embodiment shown in FIG. 6, a magnetic amplifier control winding 54a is utilized as the sensing means, in place of relay 54 of the FIG. 1 embodiment, to sense a null in current flow between the common bus 40 and the voltage divider 41. Upon a predetermined current flow through control winding 54a due to the blowing of fuses in the rectifier bank, the magnetic amplifier will become energized and, in turn, will energize indicating lamp 59. By rotating switch 47 to a position corresponding to the number of blown fuses in the rectifier bank, the current flow through control winding 54a will become substantially nulled and the magnetic amplifier and its indicating lamp 59 will become de-energized.

While we have shown and described a number of embodiments of our invention, it would be obvious to those skilled in the art that various changes and modifications may be made without departing from our invention in its broader aspects, and we, therefore, aim in the appended claims to cover all such changes and modifications as fall within the true spirit and scope of our invention.

What we claim as new and desire to secure by Letters Patent of the United States is:

1. In a rectifier system wherein a plurality of rectifier legs are connected in parallel to form a rectifier bank having voltage supply conductors connected thereacross and each rectifier leg includes a fuse and a rectifier connected in series and all of the rectifiers in all of said rectifier legs are connected in the same polarity, means for indicating the blowing of fuses in the rectifier bank comprising: a common bus; a plurality of resistors, said resistors each having one side connected to said common bus and the other side connected to the junction point of a corresponding one of the rectifiers and its corresponding fuse to effect a variation in the voltage of said bus in response to blowing of one of said fuses; a voltage divider circuit connected in parallel with the rectifier legs; voltage comparison means connected between said voltage divider and said common bus, said voltage comparison means being actuated in response to said voltage variation upon the blowing of at least one fuse in the rectifier bank and an indicating device connected to said voltage comparison means to indicate a blown fuse.

2. In a rectifier system wherein a plurality of rectifier legs are connected in parallel to form a rectifier bank having voltage supply conductors connected thereacross and each rectifier leg includes a fuse and a rectifier connected in series and all of the rectifiers in all of said legs are connected in the same polarity, means for indicating the number of blown fuses in the rectifier bank comprising: a common bus; a plurality of resistors, said resistors each having one side connected to said common bus and the other side connected to the junction point of a corresponding one of the rectifiers and its corresponding fuse to effect a variation in the voltage of said bus in response to blowing of one of said fuses; a voltage divider connected in parallel with the rectifier legs having a plurality of voltage points each corresponding to a different number of blown fuses and each having a voltage approximately equal to the voltage of said common bus following the blowing of a corresponding number of fuses; voltage comparison means having one side connected to said common bus; and means for connecting the other side of said voltage comparison means to said voltage divider at any of said voltage points in said voltage divider whereby a voltage change in the common bus due to the blowing of fuses may be substantially matched by the voltage at the connection point of the voltage comparison means to the voltage divider, an indicating device connected to said comparison means and responsive thereto for determining the number of blown fuses in the rectifier bank.

3. The combination of claim 2 wherein the means for connecting the voltage comparison means to the voltage divider comprises a switch having stationary contacts connected to said plurality of voltage points on the voltage divider and a movable contact connected to the voltage comparison means.

4. The combination of claim 2 wherein the voltage divider includes a potentiometer and the means for connecting the voltage comparison means to the voltage divider includes the movable contact of said potentiometer.

5. The combination of claim 2 wherein said voltage comparison means comprises a relay which is caused to be activated when the voltage in the common bus and the voltage at a selected point of the voltage divider are substantially equal.

6. The combination of claim 2 wherein said voltage comparison means includes a magnetic amplifier and a control winding for said magnetic amplifier, said control winding being de-energized when the voltage in the common bus and the voltage at a selected point of the voltage divider are substantially equal.

7. The combination of claim 2 wherein said voltage comparison means comprises a relay which is de-energized when the voltage in the common bus and the voltage at a selected point of the voltage divider are substantially equal.

8. In a rectifier system wherein a plurality of rectifier legs are connected in parallel to form a rectifier bank having voltage supply conductors connected thereacross and each rectifier leg includes a fuse and a rectifier connected in series and all of the rectifiers in each rectifier leg are connected in the same polarity, means for indicating the number of blown fuses in the rectifier bank comprising: a common bus; a plurality of resistors, said resistors each having one side connected to said common bus and the other side connected to the junction point of a corresponding one of the rectifiers and its corresponding fuse to effect variations in the voltage of said bus in response to the blowing of a number of said fuses; a voltage divider connected in parallel with the rectifier legs; a plurality of voltage comparison means connected to said voltage divider at selected potential tap points; a plurality of blocking rectifiers each corresponding to a different one of said voltage comparison means, said blocking rectifiers each having one side connected to said common bus and the other side connected to its corresponding voltage comparison means, indicating means connected to said voltage comparison means and responsive thereto for indicating the relative conditions of energization of deenergization of each of said voltage comparison means whereby the number of blown fuses is indicated by the energization of a corresponding number of voltage comparison means in response to said voltage variations.

9. The combination of claim 8 which further includes switching means in the supply conductors to said bank and a tripping circuit therefor connected to be controlled by one of said voltage comparison means in response to actuation thereof to effect deenergization of said rectifier bank upon the blowing of a predetermined number of fuses.

References Cited in the file of this patent
UNITED STATES PATENTS

| | | |
|---|---|---|
| 2,550,119 | Marbury et al. | Apr. 21, 1951 |
| 2,813,243 | Christian et al. | Nov. 12, 1957 |
| 2,828,461 | Pokorny | Mar. 25, 1958 |